US011976619B2

(12) United States Patent
Tsukada et al.

(10) Patent No.: US 11,976,619 B2
(45) Date of Patent: May 7, 2024

(54) FUEL INJECTION VALVE

(71) Applicant: DENSO CORPORATION, Kariya (JP)

(72) Inventors: Hideo Tsukada, Kariya (JP); Kouichi Mochizuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 419 days.

(21) Appl. No.: 17/376,489

(22) Filed: Jul. 15, 2021

(65) Prior Publication Data

US 2021/0340943 A1 Nov. 4, 2021

Related U.S. Application Data

(63) Continuation of application No. PCT/JP2019/050361, filed on Dec. 23, 2019.

(30) Foreign Application Priority Data

Jan. 17, 2019 (JP) ................................. 2019-006270

(51) Int. Cl.
*F02M 51/06* (2006.01)

(52) U.S. Cl.
CPC ... *F02M 51/061* (2013.01); *F02M 2200/8061* (2013.01); *F02M 2200/90* (2013.01)

(58) Field of Classification Search
CPC ......... F02M 51/061; F02M 2200/8061; F02M 2200/90; F02M 2200/08; F02M 51/0614
USPC .......................................................... 239/585
See application file for complete search history.

(56) References Cited

U.S. PATENT DOCUMENTS 5,634,597 A * 6/1997 Krohn ................ F02M 51/0678 239/585.5
2018/0291850 A1 10/2018 Aoki

FOREIGN PATENT DOCUMENTS

JP 2010-203237 9/2010
JP 2010203237 A * 9/2010
JP 2016-017583 2/2016

* cited by examiner

*Primary Examiner* — Yi-Kai Wang
(74) *Attorney, Agent, or Firm* — Nixon & Vanderhye P.C.

(57) ABSTRACT

A movable core is driven by a magnetic attraction force with a fixed core to move a valve body to inject fuel. A yoke accommodates the fixed core. A coil is in a coil chamber between the fixed core and the yoke. The coil chamber is filled with a filling resin member being electrically insulative. The fixed core has a core facing surface facing the movable core and includes a protruding portion that protrudes radially outer side and is in contact with the yoke to conduct the magnetic flux. A resin molding flow channel is formed in the protruding portion to cause molten resin serving as the filling resin member to flow into the coil chamber. A length of the protruding portion along a cylinder center line is set to be shorter toward a radially outer side.

10 Claims, 8 Drawing Sheets

FUEL INJECTION VALVE

CROSS REFERENCE TO RELATED APPLICATION

The present application is a continuation application of International Patent Application No. PCT/JP2019/050361 filed on Dec. 23, 2019, which designated the U.S. and claims the benefit of priority from Japanese Patent Application No. 2019-006270 filed on Jan. 17, 2019. The entire disclosures of all of the above applications are incorporated herein by reference.

TECHNICAL FIELD

The present disclosure relates to a fuel injection valve.

BACKGROUND

A known fuel injection valve includes a fixed core, a movable core, a valve body, a yoke, and a coil. The movable core is driven by a magnetic attraction force on energization of the coil to manipulate the valve body to inject fuel.

SUMMARY

A fuel injection valve according to a first aspect of the present disclosure comprises: a fixed core configured to form a part of a magnetic circuit that is to cause a magnetic flux to flow therethrough; a movable core configured to form a part of the magnetic circuit and configured to be driven by a magnetic attraction force generated in a gap between the movable core and the fixed core; a valve body configured to perform a valve opening operation caused by driving the movable core to open a nozzle hole to inject fuel; a yoke configured to form a part of the magnetic circuit and accommodating the fixed core; a coil placed in a coil chamber between the fixed core and the yoke and configured to generate the magnetic flux on energization; and a filling resin member with which the coil chamber is filled and having an electrical insulation property.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
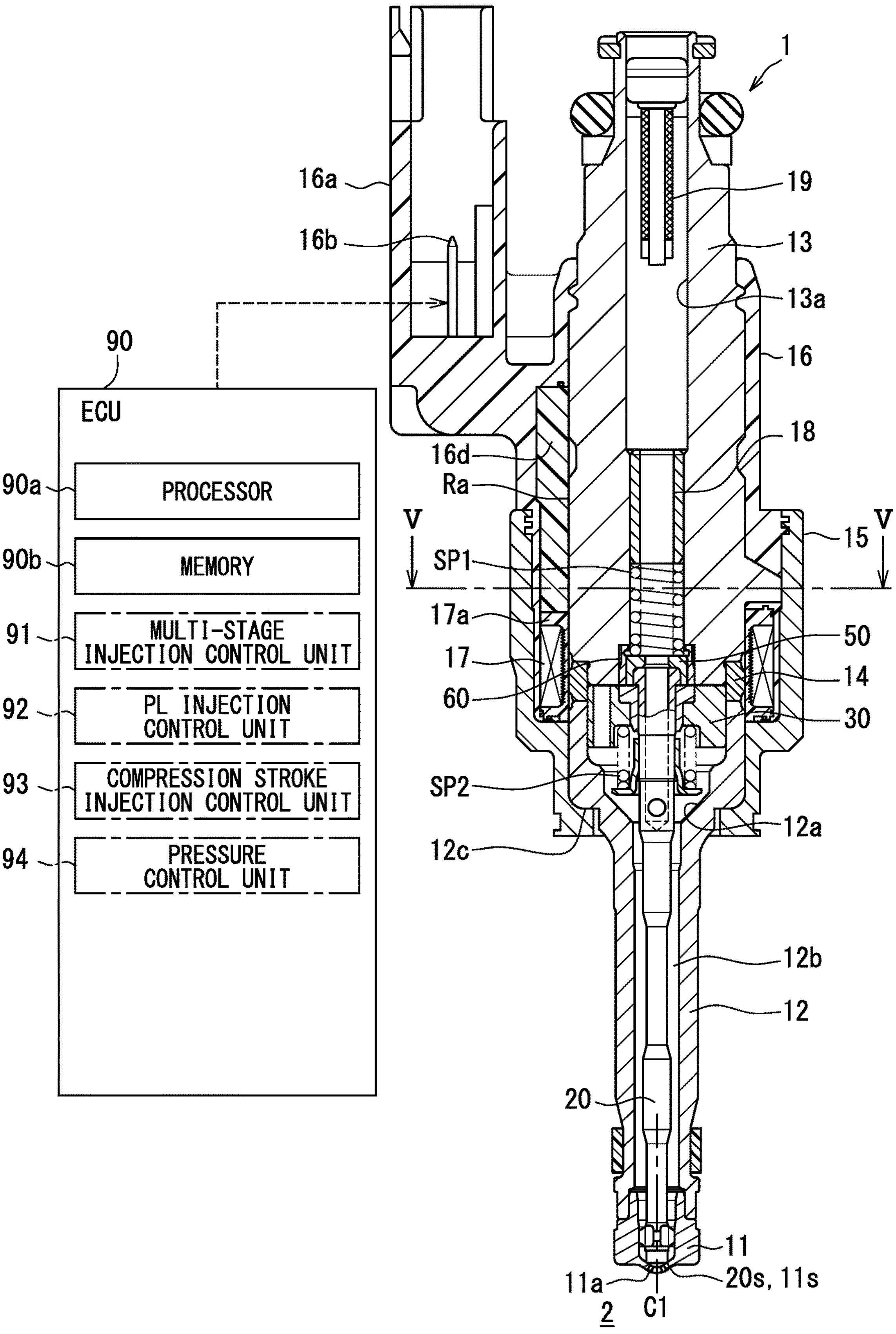
FIG. 1 is a cross-sectional view of a fuel injection valve according to a first embodiment.

As follows, examples of the present disclosure will be described.

According to an example of the present disclosure, a fuel injection valve includes a fixed core, a movable core, a valve body, a yoke, and a coil. The fixed core, the movable core, and the yoke form a magnetic circuit through which a magnetic flux generated by energization of the coil flows. The movable core is driven by a magnetic attraction force generated in a gap provided between the movable core and the fixed core to perform the valve opening operation in a valve body, whereby fuel is injected from a nozzle hole.

According to an example of the present disclosure, the fixed core has a cylindrical main body portion having a cylindrical shape and a protruding portion protruding a radially outer side from an outer peripheral surface of the cylindrical main body portion and being in contact with the yoke. The coil is placed in a coil chamber formed between the fixed core and the yoke. The coil chamber is filled with a filling resin member having an electrical insulation property.

According to an example of the present disclosure, a resin molding flow channel is formed in the protruding portion. The coil chamber is filled with the molten resin through the flow channel, and the molten resin is solidified. In this way, the filling resin member can be resin molded. In this configuration, in a case where a length (height dimension) of the protruding portion of the fixed core in a cylinder center line direction is shortened, the resin molding flow channel is shortened. Therefore, pressure loss of the molten resin in the flow channel can be reduced, and as a result, an injection pressure of the molten resin to be filled can be reduced. By shortening the length of the protruding portion, there are advantages in that the resin molding flow channel can be easily processed, and heat transfer of the molten resin which is lost on a flow channel wall surface can be restricted.

However, on the contrary, in the case where the height dimension of the protruding portion is reduced, a magnetic path cross-sectional area of a magnetic circuit in the protruding portion is reduced, so that the magnetic attraction force that drives the movable core is reduced.

According to an example of the present disclosure, a fuel injection valve comprises: a fixed core configured to form a part of a magnetic circuit that is to cause a magnetic flux to flow therethrough; a movable core configured to form a part of the magnetic circuit and configured to be driven by a magnetic attraction force generated in a gap between the movable core and the fixed core; a valve body configured to perform a valve opening operation caused by driving the movable core to open a nozzle hole to inject fuel; a yoke configured to form a part of the magnetic circuit and accommodating the fixed core; a coil placed in a coil chamber between the fixed core and the yoke and configured to generate the magnetic flux on energization; and a filling resin member with which the coil chamber is filled and having an electrical insulation property. The fixed core includes: a cylindrical main body portion that has a core facing surface facing the movable core; and a protruding portion that protrudes radially outward from an outer peripheral surface of the cylindrical main body portion and is in contact with the yoke to cause the magnetic flux to pass therethrough. The protruding portion defines a resin molding flow channel to cause molten resin serving as the filling resin member to flow into the coil chamber. A length (height dimension) of the protruding portion in a direction of a cylinder center line of the fixed core is set to be shorter toward a radially outer side of the fixed core.

The smaller the height dimension of the protruding portion at a certain diameter, the smaller the magnetic path cross-sectional area of the protruding portion is. On the other hand, since the circumferential length becomes longer as the portion is located on radially outer side of the protruding portion, if the height dimension is the same regardless of the position in the radial direction, the magnetic path cross-sectional area is larger as the portion is on the radially outer side. Therefore, a sufficient magnetic path cross-sectional area can be secured even if the height dimension is shortened by an amount corresponding to the increase in the circumferential length toward the radially outer side. In the fuel injection valve focused on this point, since the height dimension of the protruding portion is shorter toward the radially outer side, the length of the resin molding flow channel in the cylinder center line direction is shorter than the height dimension of the base end portion of the protruding portion. Therefore, the pressure loss and the heat loss of the molten resin when the molten resin flows through the resin molding flow channel can be reduced by the shortened amount.

Since the circumferential length of the magnetic path cross-sectional area at the protruding portion becomes longer toward the radially outer side of the fixed core, even if the height dimension is smaller toward the radially outer side, the minimum value of the magnetic path cross-sectional area inside the protruding portion can be kept unchanged. Therefore, it is possible to realize a reduction of injection pressure of the molten resin serving as the filling resin member and a reduction of heat loss of the molten resin while restricting a reduction of magnetic attraction force for driving the movable core.

Hereinafter, multiple embodiments of the present disclosure will be described with reference to the drawings. Duplicate description may be omitted by assigning the same reference numerals to the corresponding configuration elements in each embodiment. In a case where only a part of the configuration is described in each embodiment, the configurations of the other embodiments described above can be applied to the other parts of the configuration.

First Embodiment

A fuel injection valve 1 illustrated in FIG. 1 is a direct injection type which is attached to a cylinder head of an ignition type internal combustion engine mounted on a vehicle to directly inject fuel into a combustion chamber 2 of the internal combustion engine. Liquid gasoline fuel stored in an in-vehicle fuel tank is pressurized by a fuel pump (not illustrated) and supplied to the fuel injection valve 1, and the supplied high-pressure fuel is injected into the combustion chamber 2 from a nozzle hole 11*a* formed in the fuel injection valve 1.

The fuel injection valve 1 is of a center disposition type disposed at a center of the combustion chamber 2. Specifically, the nozzle hole 11 a is located between an intake port and an exhaust port when viewed in an axis line direction of a piston of the internal combustion engine. The fuel injection valve 1 is attached to a cylinder head such that the axis line direction (vertical direction in FIG. 1) of the fuel injection valve 1 is parallel to the axis line direction of the piston. The fuel injection valve 1 is located on the axis line of the piston or in the vicinity of an ignition plug located on the axis line of the piston.

An operation of the fuel injection valve 1 is controlled by a control device 90 mounted on the vehicle. The control device 90 has at least one calculation processing device (processor 90*a*) and at least one storage device (memory 90*b*) as a storage medium for storing a program executed by the processor 90*a* and data. The fuel injection valve 1 and the control device 90 provide a fuel injection system.

The control device and a method thereof described in the present disclosure may be implemented by a dedicated computer configuring a processor programmed to perform one or more functions embodied by a computer program. Alternatively, the control device and the method thereof described in the present disclosure may be implemented by a dedicated hardware logic circuit. Alternatively, the control device and the method thereof described in the present disclosure may be implemented by one or more dedicated computers configured by a combination of a processor executing a computer program and one or more hardware logic circuits. The computer program may also be stored in a computer-readable non-transitory tangible recording medium as instructions to be executed by a computer.

The fuel injection valve 1 includes a nozzle hole body 11, a main body 12, a fixed core 13, a non-magnetic member 14, a coil 17, a support member 18, a filter 19, a first spring member SP1 (elastic member), a cup 50, a guide member 60, a movable portion M (see FIGS. 2 and 3), and the like. The movable portion M is an assembly in which a needle 20 (valve body), a movable core 30, a second spring member SP2, a sleeve 40, and the cup 50 are assembled. The nozzle hole body 11, the main body 12, the fixed core 13, the support member 18, the needle 20, the movable core 30, the sleeve 40, the cup 50, and the guide member 60 are made of metal.

The nozzle hole body 11 has multiple nozzle holes 11*a* for injecting fuel. The nozzle hole 11*a* is formed by performing a laser process on the nozzle hole body 11. The needle 20 is located inside the nozzle hole body 11. A fuel passage communicating with an inflow port of the nozzle hole 11*a* is formed between an outer surface of the needle 20 and an inner surface of the nozzle hole body 11.

A seating surface 11*s* where a seat surface 20*s* formed on the needle 20 unseats from and seats on is formed on an inner peripheral surface of the nozzle hole body 11. The seat surface 20*s* and the seating surface 11*s* have a shape extending annularly around a center axis line (axis line C1) of the needle 20. When the needle 20 is unseated from and seated on the seating surface 11*s*, the fuel passage is opened and closed, and the nozzle hole 11*a* is opened and closed. The needle 20 corresponds to a "valve body" that opens and closes the nozzle hole 11*a* by opening and closing the fuel passage, is formed of martensitic stainless or the like, and has a shape extending in the axis line C1 direction.

When the needle 20 performs the valve closing operation and the seat surface 20*s* comes into contact with the seating surface 11*s*, the seat surface 20*s* and the seating surface 11*s* come into line abut against each other. After that, when the seat surface 20*s* is pressed against the seating surface 11*s* by an elastic force of the first spring member SP1, the needle 20 and the nozzle hole body 11 are elastically deformed by the pressing force and come into surface abut against each other. A value obtained by dividing the pressing force by a surface-contacting area is a seat surface pressure, and the first spring member SP1 is set such that the seat surface pressure equal to or higher than a predetermined value is secured.

The main body 12 and the non-magnetic member 14 have a cylindrical shape. A cylindrical end portion of the main body 12, which is a portion on a side (nozzle hole side) closer to the nozzle hole 11*a*, is welded to be fixed to the nozzle hole body 11. A cylindrical end portion of the main body 12 on a side (side opposite to the nozzle hole) away from the nozzle hole 11*a* is welded to be fixed to the cylindrical end portion of the non-magnetic member 14. A cylindrical end portion of the non-magnetic member 14 on the side opposite to the nozzle hole is welded to be fixed to the fixed core 13.

An outer peripheral surface of the fixed core 13 is press-fitted and fixed to an inner peripheral surface of the yoke 15 in a state where the yoke 15 is locked to a locking portion 12*c* of the main body 12. An axial force generated by this press-fit generates a surface pressure that presses the yoke 15, the main body 12, the non-magnetic member 14, and the fixed core 13 against each other in the axis line C1 direction (vertical direction in FIG. 1).

The main body 12 is formed of a magnetic material such as stainless steel, and has a flow channel 12*b* for causing the fuel to flow to the nozzle hole 11*a*. In the flow channel 12*b*, the needle 20 is accommodated in a movable state in the axis line C1 direction. In the movable chamber 12*a*, the movable portion M (see FIGS. 2 and 3) which is the assembly in which the needle 20, the movable core 30, the second spring member SP2, the sleeve 40, and the cup 50 are assembled is accommodated in a movable state.

The flow channel 12*b* communicates with a downstream side of the movable chamber 12*a* and has a shape extending in the axis line C1 direction. A center line of the flow channel 12*b* and the movable chamber 12*a* coincides with the cylinder center line (axis line C1) of the main body 12. A portion of the needle 20 on the nozzle hole side is slidably supported by an inner wall surface 11*c* of the nozzle hole body 11, and a portion of the needle 20 on the side opposite to the nozzle hole is slidably supported by an inner wall surface of the cup 50. As described above, by slidably supporting two positions of an upstream end portion and a downstream end portion of the needle 20, a movement of the needle 20 in a radial direction is regulated, and a tilt of the needle 20 with respect to the axis line C1 of the main body 12 is regulated.

The cup 50 has a disk portion 52 in a disk shape and a cylindrical portion 51 in a cylindrical shape. The disk portion 52 has a through-hole 52*a* penetrating in the axis line C1 direction. A surface of the disk portion 52 on the side opposite to the nozzle hole functions as a spring abutment surface that abuts against the first spring member SP1. A surface of the disk portion 52 on the nozzle hole side functions as a valve closing force transmission abutment surface 52*c* that abuts against the needle 20 and transmits a first elastic force (valve closing elastic force). The cylindrical portion 51 has a cylindrical shape extending from an outer peripheral end of the disk portion 52 to the nozzle hole side. A nozzle hole-side end surface of the cylindrical portion 51 functions as a core abutment end surface 51*a* that abuts against the movable core 30. An inner wall surface of the cylindrical portion 51 slides with an outer peripheral surface of the needle 20.

The fixed core 13 is formed of a magnetic material such as stainless steel, and has a flow channel 13*a* on an inside thereof for causing the fuel to flow to the nozzle hole 11*a*. The flow channel 13*a* communicates with an upstream side of an internal passage 20*a* (see FIG. 2) formed inside the needle 20 and the movable chamber 12*a*, and has a shape extending in the axis line C1 direction. The guide member 60, the first spring member SP1, and the support member 18 are accommodated in the flow channel 13*a*.

The support member 18 has a cylindrical shape or a C-shaped cross section with a notch, and is press-fitted and fixed to the inner wall surface of the fixed core 13. The first spring member SP1 is a coil spring disposed on the downstream side of the support member 18, and is elastically deformed in the axis line C1 direction. An upstream-side end surface of the first spring member SP1 is supported by the support member 18, and a downstream-side end surface of the first spring member SP1 is supported by the cup 50. The cup 50 is urged to the downstream side by a force (first elastic force) generated by the elastic deformation of the first spring member SP1. By adjusting a press-fit amount of the support member 18 in the axis line C1 direction, a size (first set load) of the elastic force for urging the cup 50 is adjusted.

The filter 19 captures foreign matter contained in the fuel supplied to the fuel injection valve 1. The filter 19 is press-fitted and fixed to an upstream-side portion of the support member 18 in the inner wall surface of the fixed core 13.

Figure 2:
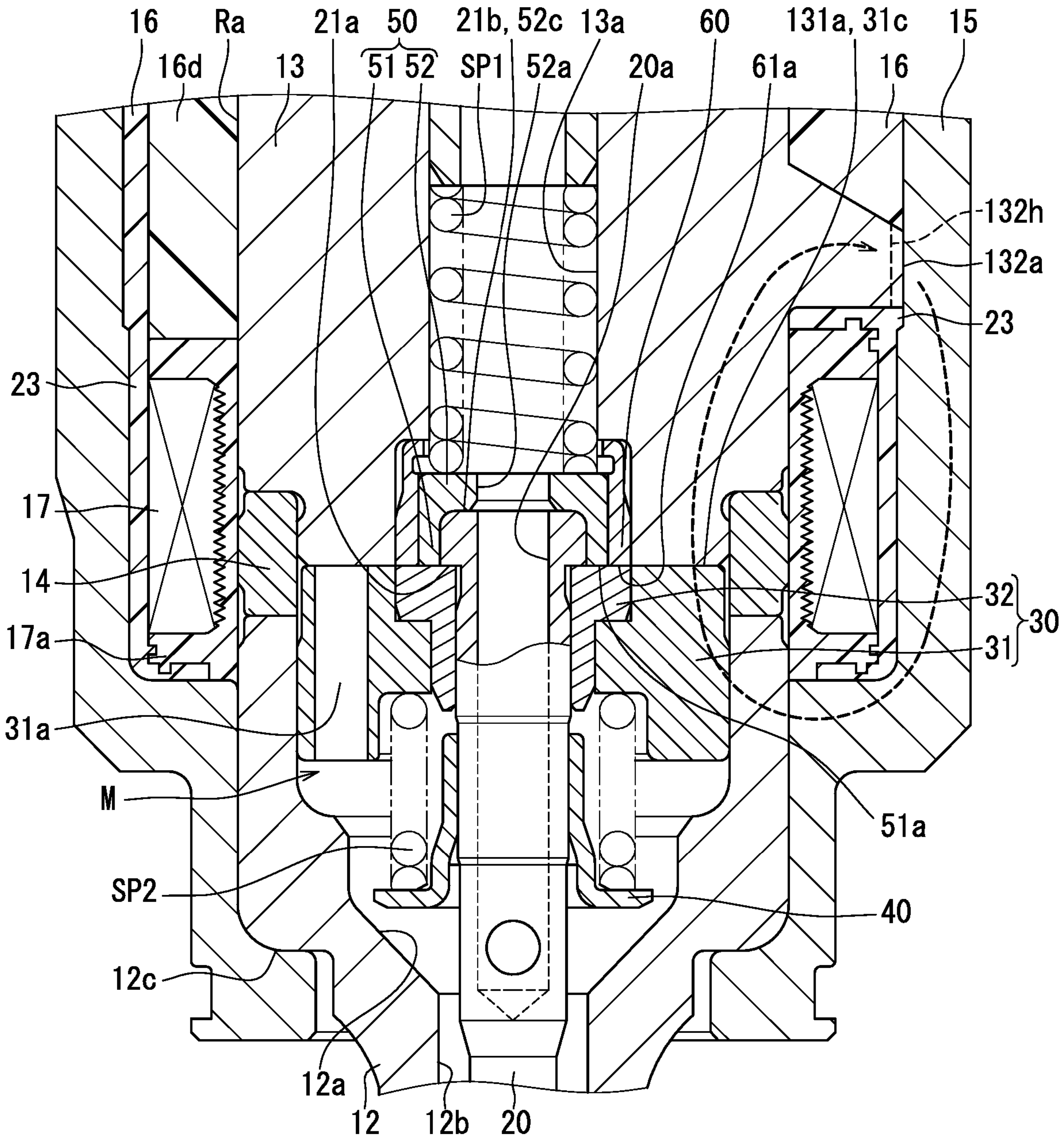
FIG. 2 is an enlarged view of a portion of a magnetic circuit of FIG. 1.

As illustrated in FIG. 2, the guide member 60 has a cylindrical shape formed of martensitic stainless or the like, and is press-fitted and fixed to the fixed core 13. A nozzle hole-side end surface of the guide member 60 on functions as a stopper abutment end surface 61*a* that abuts against the movable core 30. An inner wall surface of the guide member 60 slides with an outer peripheral surface 51*d* of the cylindrical portion 51 of the cup 50. In short, the guide member 60 has a guide function of sliding the outer peripheral surface of the cup 50 moving in the axis line C1 direction and a stopper function of restricting the movement of the movable core 30 toward the side opposite to the nozzle hole by abutting against the movable core 30 which moves in the axis line C1 direction.

A resin member 16 is provided on the outer peripheral surface of the fixed core 13. The resin member 16 has a connector housing 16*a*, and a terminal 16*b* is accommodated inside the connector housing 16*a*. The terminal 16*b* is electrically connected to the coil 17. An external connector (not illustrated) is connected to the connector housing 16*a*, and power is supplied to the coil 17 through the terminal 16*b*. The coil 17 is wound around a bobbin 17*a* having an electrical insulation property to form a cylindrical shape, and is disposed radially outer side of the fixed core 13, the non-magnetic member 14, and the movable core 30. The fixed core 13, the yoke 15, the main body 12, and the movable core 30 form a magnetic circuit through which a magnetic flux generated with supply of power (energization) to the coil 17 flows (see a dotted arrow in FIG. 2).

The coil 17 is disposed in a coil chamber R together with the bobbin 17*a*. The coil chamber R has a cylindrical shape formed by being surrounded by the fixed core 13, the yoke 15, the main body 12, and the non-magnetic member 14. The coil chamber R in which the coil 17 and the bobbin 17*a* are disposed is filled with a filling resin member 23 having the electrical insulation property.

As illustrated in FIG. 2, the movable core 30 is disposed on the nozzle hole side with respect to the fixed core 13, and is accommodated in the movable chamber 12*a* in a movable state in the axis line C1 direction. The movable core 30 has an outer core 31 and an inner core 32. The outer core 31 has a cylindrical shape formed of a magnetic material such as stainless, and the inner core 32 has a cylindrical shape formed of martensitic stainless or the like. The outer core 31 is press-fitted and fixed to an outer peripheral surface of the inner core 32. Multiple through-holes 31*a* are formed in the outer core 31 (see FIG. 2). The through-holes 31*a* have a circular shaped cross section extending in the axis line C1 direction, and these through-holes 31*a* are disposed at equal intervals in a circumferential direction around the axis line C1.

The needle 20 is inserted to be disposed inside the cylinder of the inner core 32. The inner core 32 is assembled to the needle 20 in a slidable state in the axis line C1 direction with respect to the needle 20. The inner core 32 abuts against the guide member 60 as a stopper member, the cup 50, and the needle 20. Therefore, a material having a higher hardness than that of the outer core 31 is used for the inner core 32. The outer core 31 has a core facing surface 31*c* facing the fixed core 13, and a gap is formed between the core facing surface 31*c* and the fixed core 13. Therefore, in a state where the magnetic flux flows by energizing the coil 17 as described above, the magnetic attraction force attracted to the fixed core 13 acts on the outer core 31 by forming the gap.

The sleeve 40 is press-fitted and fixed to the needle 20, and supports the nozzle hole-side end surface of the second spring member SP2. The second spring member SP2 is a coil spring elastically deformed in the axis line C1 direction. The opposite nozzle hole-side end surface of the second spring member SP2 of the nozzle hole is supported by the outer core 31. The outer core 31 is urged to the side opposite to the nozzle hole by a force (second elastic force) generated by the elastic deformation of the second spring member SP2. By adjusting a press-fit amount of the sleeve 40 in the axis line C1 direction, a size of the second elastic force (second set load) for urging the movable core 30 at the time of valve closing is adjusted. The second set load of the second spring member SP2 is smaller than the first set load of the first spring member SP1.

<Description of Operation>

Next, an operation of the fuel injection valve 1 will be described with reference to FIG. 3.

Figure 3:
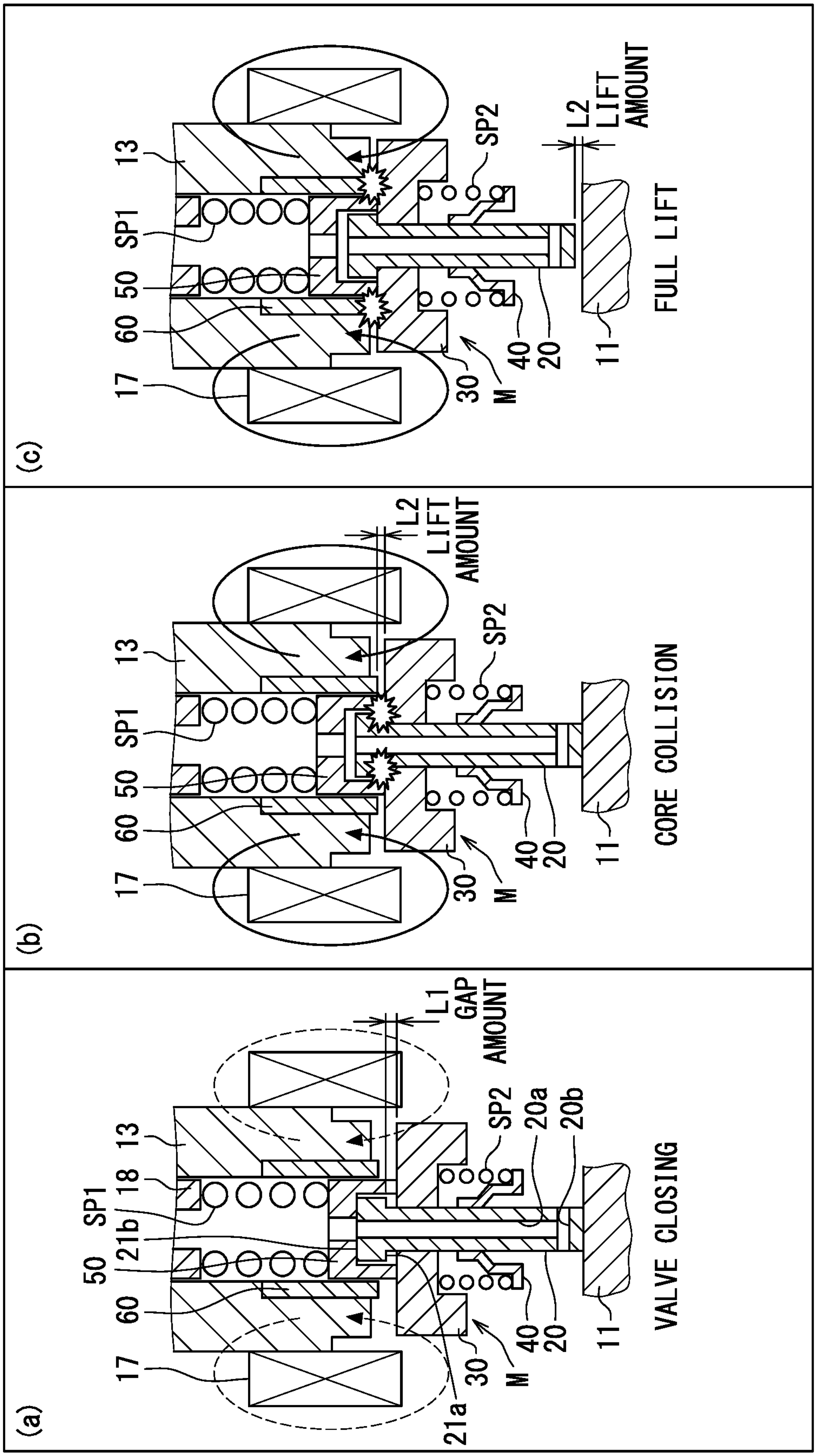
FIG. 3 is a schematic view illustrating an operation of the fuel injection valve according to the first embodiment, in the drawing, column (a) illustrates a valve close state, column (b) illustrates a state where a movable core that is moved by a magnetic attraction force collides with a valve body, and column (c) illustrates a state where the movable core that is further moved by the magnetic attraction force collides with a guide member.

As illustrated in column (a) in FIG. 3, the magnetic attraction force is not generated in a state where the energization of the coil 17 is turned off, so that the magnetic attraction force urged toward the valve opening side does not act on the movable core 30. The cup 50 urged to the side of the valve closing by the first elastic force of the first spring member SP1 abuts against the valve body abutment surface 21*b* (see FIG. 2) of the needle 20 at the time of valve closing and the inner core 32, and transmits the first elastic force.

The movable core 30 is urged toward the valve closing side by the first elastic force of the first spring member SP1 transmitted from the cup 50, and is urged toward the valve opening side by the second elastic force of the second spring member SP2. Since the first elastic force is larger than the second elastic force, the movable core 30 is in a state of being pushed by the cup 50 and moved (lifted down) toward the nozzle hole. The needle 20 is urged toward the valve closing side by the first elastic force transmitted from the cup 50, and is in a state of being pushed by the cup 50 and moved (lifted down) toward the nozzle hole, that is, in a state of being seated on the seating surface 11*s* to close the valve. In this valve close state, a gap is formed between the valve body abutment surface 21*a* (see FIG. 2) of the needle 20 when the valve is opened and the inner core 32, and a length of the gap in the axis line C1 direction in the valve close state is referred to as a gap amount L1.

As illustrated in column (b) in FIG. 3, in a state immediately after the energization of the coil 17 is switched from off to on, the magnetic attraction force urged toward the valve opening side acts on the movable core 30, so that the movable core 30 initiates movement to the valve opening side. When the movable core 30 moves while pushing up the cup 50 and an amount of the movement thereof reaches the gap amount L1, the inner core 32 collides with the valve body abutment surface 21*a* of the needle 20 when the valve is opened. At the time of the collision, a gap is formed between the guide member 60 and the inner core 32, and a length of the gap in the axis line C1 direction is referred to as a lift amount L2.

During a period up to the time of the collision, a valve closing force by a fuel pressure applied to the needle 20 is not applied to the movable core 30, so that a collision speed of the movable core 30 can be increased accordingly. Since such a collision force is added to the magnetic attraction force and used as the valve opening force of the needle 20, the needle 20 can perform the valve opening operation even with the high-pressure fuel while restricting an increase in the magnetic attraction force required for valve opening.

After the collision, the movable core 30 further continues to move by the magnetic attraction force, and when the amount of the movement after the collision reaches the lift amount L2, as illustrated in column (c) in FIG. 3, the inner core 32 collides with the guide member 60 to stop the movement. A separation distance between the seating surface 11*s* and the seat surface 20*s* in the axis line C1 direction at the time of the stop of this movement corresponds to a full lift amount of the needle 20, and coincides with the lift amount L2 described above.

After that, when the energization of the coil 17 is switched from on to off, the magnetic attraction force also decreases as a drive current decreases, and the movable core 30 initiates the movement to the valve closing side together with the cup 50. The needle 20 is pushed by the pressure of the fuel filled between the needle 20 and the cup 50 to initiate the lift-down (valve closing operation) simultaneously with the initiation of the movement of the movable core 30.

After that, when the needle 20 is lifted down by the lift amount L2, the seat surface 20*s* is seated on the seating surface 11*s*, and the nozzle hole 11*a* is closed. After that, the movable core 30 continues to move toward the valve closing side together with the cup 50, and when the cup 50 abuts against the needle 20, the movement of the cup 50 toward the valve closing side stops. After that, the movable core 30 further continues to move toward the valve closing side (inertial movement) by an inertial force, and then moves (rebounds) toward the valve opening side by the elastic force of the second spring member SP2. After that, the movable core 30 collides with the cup 50 and moves (rebounds) toward the valve opening side together with the cup 50, but is quickly pushed back by the valve closing elastic force to converge to an initial state illustrated in column (a) in FIG. 3.

Therefore, the smaller the rebound and the shorter the time required for convergence, the shorter the time to return to the initial state from the end of injection is. Therefore, when executing multi-stage injection in which fuel is injected multiple times per combustion cycle of the internal combustion engine, an interval between injections can be shortened and the number of injections included in the multi-stage injection can be increased. By shortening the convergence time as described above, it is possible to control the injection amount with high accuracy in a case where partial lift injection described below is executed. The partial lift injection is injection of a minute amount at a short valve opening time by stopping the energization to the coil 17 and initiating the valve closing operation before the needle 20 that performs the valve opening operation reaches the full lift position (maximum valve opening position).

The above-described energization on/off is controlled by the processor 90*a* executing a program stored in the memory 90*b*. Basically, based on the load and the rotation speed of the internal combustion engine, the fuel injection amount, the injection timing, and the number of injections relating to the multi-stage injection in one combustion cycle are calculated by the processor 90*a*. The processor 90*a* executes various programs to execute multi-stage injection control, partial lift injection control (PL injection control), compression stroke injection control, and pressure control which are described below. The control device 90 when executing these controls corresponds to a multi-stage injection control unit 91, a partial lift injection control unit (PL injection control unit 92), a compression stroke injection control unit 93, and a pressure control unit 94 illustrated in FIG. 1.

The multi-stage injection control unit 91 controls the energization on/off of the coil 17 so as to inject fuel from the nozzle hole 11 a multiple times during one combustion cycle of the internal combustion engine. The PL injection control unit 92 controls the energization on/off of the coil 17 so that the valve closing operation is initiated after the needle 20 is unseated from the seating surface 11*s* and before the needle 20 reaches the full lift position. For example, as the number of multi-stage injections increases, the injection amount of one injection becomes very small, and therefore, in a case of such a small amount of injection, the PL injection control is executed.

The compression stroke injection control unit 93 controls the energization on/off of the coil 17 so as to inject the fuel from the nozzle hole 11*a* in a period including a part of the compression stroke period of the internal combustion engine. In a case where the fuel is injected into the combustion chamber 2 in the compression stroke period, the time from the injection start timing to the ignition timing is short, so that the time for sufficiently mixing the fuel and air is short. Therefore, the fuel injection valve 1 of this type is required to inject the fuel from the nozzle hole 11*a* in a state of high penetration force in order to promote a mixing property of the fuel and air. It is also required to increase the injection pressure in order to break up the spray in a short time.

The pressure control unit 94 controls the pressure (supply fuel pressure) of the fuel supplied to the fuel injection valve 1 to an optional target pressure within a predetermined range. Specifically, the supply fuel pressure is controlled by controlling the fuel discharge amount by the above-described fuel pump.

<Detailed Description of Fixed Core 13>

Figure 4:
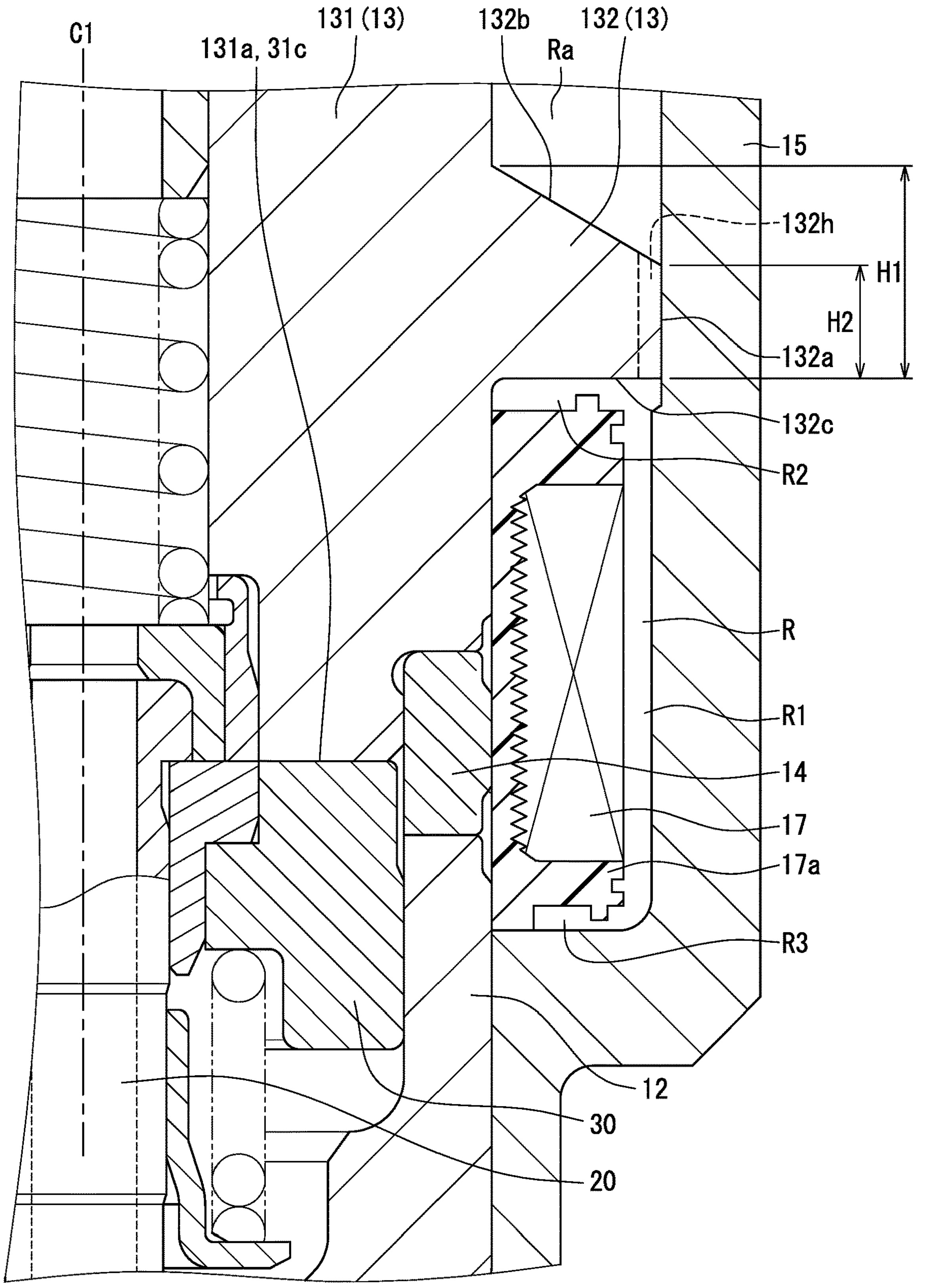
FIG. 4 is an enlarged view of a portion of the magnetic circuit of FIG. 2.
Figure 5:
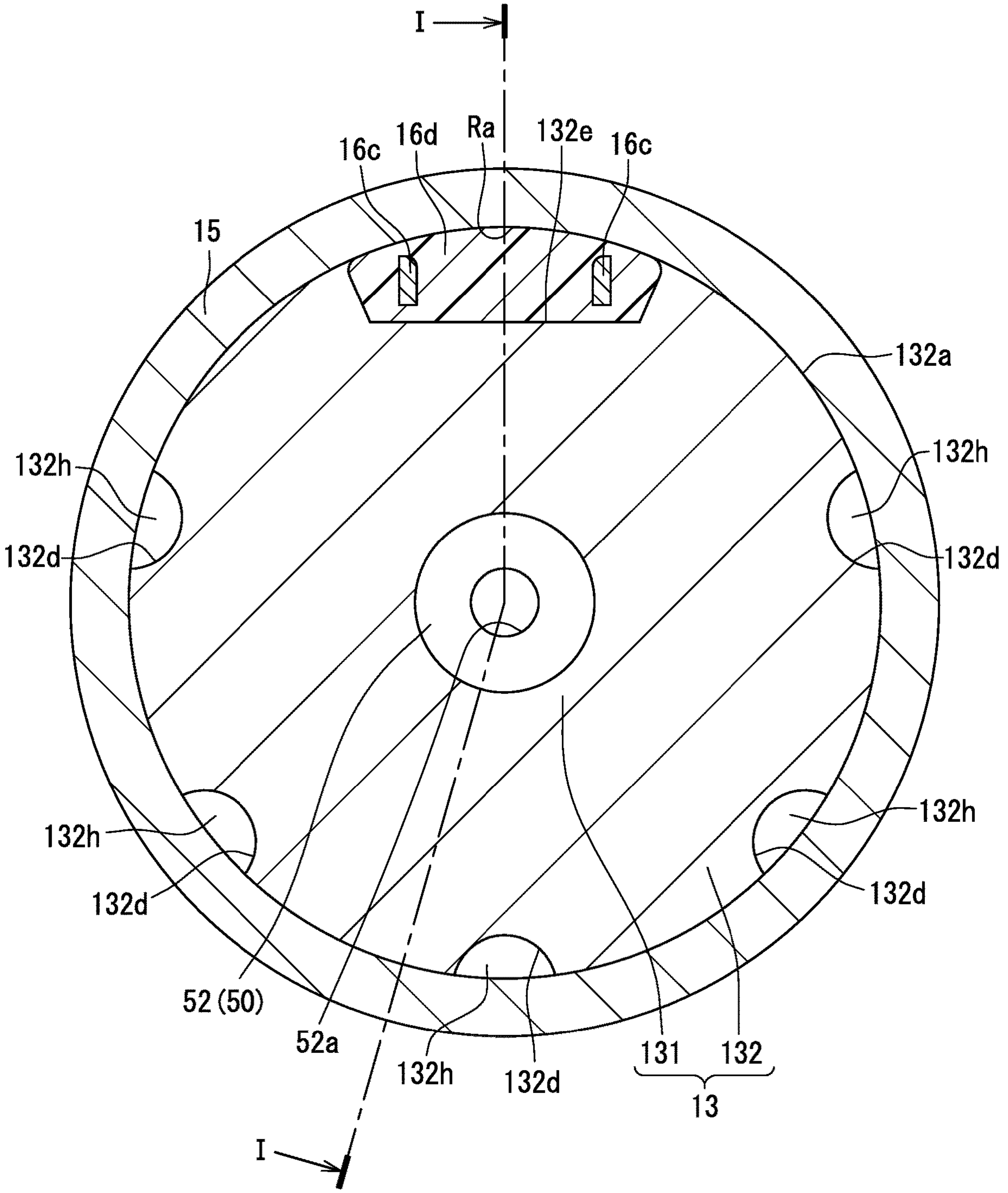
FIG. 5 is a cross-sectional view which is taken along line V-V of FIG. 1.

Hereinafter, the fixed core 13 will be explained in detail with reference to FIGS. 4 and 5. FIGS. 4 and 5 illustrate the fuel injection valve 1 in a state where the resin member 16 and the filling resin member 23 are not provided.

The fixed core 13 has a cylindrical main body portion 131 and a protruding portion 132. The cylindrical main body portion 131 has a cylindrical shape extending in the driving direction of the movable core 30, that is, in the axis line C1 direction. The first spring member SP1, the support member 18, and the filter 19 are disposed inside a cylinder of the cylindrical main body portion 131. A cylinder end surface of the cylindrical main body portion 131 has a core facing surface 131*a* facing the core facing surface 31*c* of the movable core 30. A gap is provided between the core facing surfaces 31*c* and 131*a* of the movable core 30 and the fixed core 13, and the movable core 30 is attracted to the fixed core 13 and driven by a magnetic attraction force generated in the gap.

The protruding portion 132 protrudes to the radially outer side from an outer peripheral surface of the cylindrical main body portion 131 and abuts against the yoke 15. Therefore, a magnetic flux communicates between the fixed core 13 and the yoke 15. The protruding portion 132 does not protrude from the entire outer peripheral surface of the cylindrical main body portion 131 in the axis line C1 direction, but protrudes from a part of the outer peripheral surface thereof (see FIG. 4). The protruding portion 132 does not protrude from the entire outer peripheral surface of the cylindrical main body portion 131 in the circumferential direction, but protrudes from a portion excluding a terminal chamber Ra in which a terminal extending portion 16*c* and an insulation member 16*d* are disposed (see FIG. 5).

The terminal extending portion 16*c* is a portion of the terminal 16*b* extending in the axis line C1 direction, is a portion connected to the coil 17, and is covered with the insulation member 16*d* made of resin. A part of the terminal chamber Ra is provided between the outer peripheral surface of the cylindrical main body portion 131 of the fixed core 13 and the inner peripheral surface of the yoke 15. A portion of the insulation member 16*d* located outside the terminal chamber Ra is covered with the fixed core 13 and the resin member 16.

The protruding end surface 132*a*, which is the outer peripheral surface of the protruding portion 132, is press-fitted into the inner peripheral surface of the yoke 15. The protruding end surface 132*a* has a shape extending in parallel with the axis line C1 direction. A protruding upper surface 132*b* of the protruding portion 132, which is a surface (upper surface) on the side opposite to the coil chamber R, has a tapered shape linearly extending in a direction inclining with respect to the axis line C1 in a cross-sectional view including the axis line C1. A protruding bottom surface 132*c* of the protruding portion 132, which is a surface (bottom surface) on the side on which the coil chamber R is formed, has a horizontal shape linearly extending in a direction orthogonal to the axis line C1 in a cross-sectional view including the axis line C1.

The height dimension, which is the length of the protruding portion 132 in the axis line C1 direction, is shorter toward the radially outer side of the fixed core 13. Therefore, a height dimension H2 of the protruding end surface 132*a* is smaller than a height dimension H1 of a boundary portion (base end portion) of the protruding portion 132 with the cylindrical main body portion 131.

The coil chamber R and the terminal chamber Ra are partitioned by the protruding portion 132. The protruding portion 132 is formed with a resin molding flow channel 132*h* for causing the molten resin serving as the filling resin member 23 to flow into the coil chamber R. The resin molding flow channel 132*h* has a shape extending in parallel with the axis line C1 direction. The resin molding flow channel 132*h* is partitioned between a notch portion 132*d* provided in the protruding end surface 132*a* of the protruding portion 132 and the inner peripheral surface of the yoke 15.

Multiple resin molding flow channels 132*h* are provided around the axis line C1. Multiple resin molding flow channels 132*h* are disposed at equal intervals around the axis line C1. Specifically, as illustrated in FIG. 5, multiple resin molding flow channels 132*h* are disposed at equal intervals in the circumferential direction in a region where the protruding portion 132 is provided in a region excluding the terminal chamber Ra. The shape of the resin molding flow channel 132*h* in a cross section perpendicular to the axis line C1 direction is a semicircular shape as illustrated in FIG. 5. That is, the notch portion 132*d* has an arc shape in the cross-sectional view.

The inner peripheral surface of the bobbin 17*a* disposed in the coil chamber R is disposed so as to face the outer peripheral surfaces of the cylindrical main body portion 131, the non-magnetic member 14, and the main body 12. In the coil chamber R, a first region R1 is defined between the outer peripheral surfaces of the bobbin 17*a* and the coil 17, and the inner peripheral surface of the yoke 15, a second region R2 is defined between the upper surface of the bobbin 17*a* and the protruding bottom surface 132*c*, and a third region R3 is defined between the bottom surface of the bobbin 17*a* and the yoke 15. The first region R1, the second region R2, and the third region R3 are filled with the filling resin member 23. The resin molding flow channel 132*h* is disposed at a position overlapping with the first region R1 when viewed in the axis line C1 direction.

<Definition of Magnetic Path Cross-Sectional Area>

Next, the magnetic path cross-sectional area of each portion forming the magnetic circuit will be explained. A magnetic path cross-sectional area is an area of a surface perpendicular to the magnetic flow direction, and, for example, an area (tip area) of the protruding end surface 132*a* of the fixed core 13 corresponds to the magnetic path cross-sectional area. An area of the notch portion 132*d* is not included in the magnetic path cross-sectional area because it is not in contact with the yoke 15, and an area of a portion of the protruding portion 132 that is in contact with the yoke 15 by press-fit corresponds to the magnetic path cross-sectional area. An area of the boundary portion of the protruding portion 132 with the cylindrical main body portion 131, that is, the area (base end area) at the portion of the height dimension H1 illustrated in FIG. 4 corresponds to the magnetic path cross-sectional area.

A tip area is set larger than the base end area. These areas are specified by the height dimensions H1 and H2, and the circumferential length. The circumferential length of the tip area is longer than the circumferential length of the base end area, and the height dimension H2 of the tip area is smaller than the height dimension H1 of the base end area. The circumferential length of the tip area does not include a portion that is not in contact with the yoke 15. Specifically, since a groove 132*e* and the notch portion 132*d* forming the terminal chamber Ra are not in contact with the yoke 15, they are not included in the circumferential length of the tip area. A portion of the protruding portion 132 which is in contact with the yoke 15 by press-fit is an object of the above-mentioned circumferential length.

The area of the core facing surface 31*c* of the movable core 30 and the area (core facing area) of the core facing surface 131*a* of the fixed core 13 correspond to the magnetic path cross-sectional area. In the area of the core facing surface 131*a*, an area of a portion excluding the through-hole 31*a* of the movable core 30 is not included in the magnetic path cross-sectional area because of not facing the movable core 30. The magnetic path cross-sectional area (tip area) of the protruding end surface 132*a* is set to be larger than the magnetic path cross-sectional area of the core facing surface 131*a* of the fixed core 13.

<Description of Manufacturing Method>

Next, a manufacturing method of the fuel injection valve 1 will be explained.

First, the needle 20, the movable core 30, the second spring member SP2, the sleeve 40, and the cup 50 are assembled to form the movable portion M. After the non-magnetic member 14 and the nozzle hole body 11 are welded to the main body 12, the movable portion M is incorporated into the main body 12, and then the main body 12 and the fixed core 13 are assembled and welded.

On the other hand, the coil 17 is wound around the bobbin 17*a*, the end portion of the coil 17 is connected to the terminal extending portion 16*c*, and the insulation member 16*d* is assembled to the terminal extending portion 16*c* to form a coil assembly. The coil assembly is assembled to the fixed core 13 after the welding, and then the yoke 15 is press-fitted into the fixed core 13.

After that, a mold for forming the resin member 16 is assembled to the fixed core 13 after press-fit, and molten resin is injected between the mold and the fixed core 13 at a predetermined pressure. The molten resin thus injected flows into the terminal chamber Ra, and then into the coil chamber R through the resin molding flow channel 132*h*. After that, the molten resin is cooled and solidified, and the mold is removed. Therefore, the coil chamber R is filled with the filling resin member 23, and the resin molding flow channel 132*h* and the terminal chamber Ra are also filled with the resin member.

Next, the first spring member SP1 and the support member 18 are assembled to adjust the first set load, and then the filter 19 is assembled to the fixed core 13. As described above, the fuel injection valve 1 is manufactured.

<Effects>

According to the present embodiment, the fixed core 13 has the cylindrical main body portion 131 formed with the core facing surface 131*a* facing the movable core 30, and the protruding portion 132 protruding radially outer side from the outer peripheral surface of the cylindrical main body portion 131 and abutting against the yoke 15. The protruding portion 132 is formed with a resin molding flow channel 132*h* for causing the molten resin serving as the filling resin member 23 to flow into the coil chamber R. The length (height dimension) of the protruding portion 132 in the direction of the cylinder center line (direction of the axis line C1) of the fixed core 13 is shorter (smaller) toward the radially outer side of the fixed core 13. Therefore, the length of the resin molding flow channel 132*h* in the axis line C1 direction is shorter than the height dimension H1 of the base end portion of the protruding portion 132. Therefore, the pressure loss when the molten resin flows through the resin molding flow channel 132*h* can be reduced by the shortened amount, and further, the heat loss of the molten resin that is transferred on the wall surface of the resin molding flow channel 132*h* can be reduced.

Since the diameter of the magnetic path cross-sectional area at the protruding portion 132 increases toward the radially outer side of the fixed core 13 increases, even if the height dimension decreases toward the radially outer side, a minimum value of the magnetic path cross-sectional area inside the protruding portion 132 can be kept unchanged. Therefore, the reduction of the injection pressure of the molten resin can be realized while restricting the reduction of the magnetic attraction force for driving the movable core 30.

In the present embodiment, the protruding portion 132 is press-fitted into the yoke 15. Specifically, the protruding end surface 132*a* is press-fitted into the inner peripheral surface of the yoke 15. Therefore, according to the above-described configuration in which the height dimension of the protruding portion 132 is set to be smaller toward the radially outer side, the length of the protruding end surface 132*a* in the axis line C1 direction, which is the surface to be press-fitted, is shorter than the height dimension H1 of the base end portion of the protruding portion 132. Therefore, the load required for the press-fit can be reduced by the shortened amount.

In the present embodiment, the length of the protruding portion 132 in the axis line C1 direction gradually decreases from radially inner side to the outer side of the fixed core 13. Therefore, the molten resin easily moves in the radial direction along the protruding portion 132. Therefore, it is possible to promote the injection pressure drop of the molten resin.

In the present embodiment, the resin molding flow channel 132*h* is formed between the yoke 15 and the notch portion 132*d* provided on the protruding end surface 132*a* of the protruding portion 132. Therefore, a process required for the protruding portion 132 can be facilitated as compared with a case where a through-hole is formed in the protruding portion 132 and the through-hole becomes a resin molding flow channel. In the present embodiment, of the magnetic path cross-sectional area of the magnetic circuit, the magnetic path cross-sectional area (tip area) at the contact portion between the protruding portion 132 and the yoke 15 is larger than the magnetic path cross-sectional area (core facing area) on the core facing surface 131*a*. Therefore, the magnetic flux can be restricted from being throttled by the tip area in the entire magnetic circuit. That is, it is possible to avoid a situation in which the magnetic flux does not saturate on the core facing surface 131*a* and the magnetic flux saturates on the protruding end surface 132*a*. Therefore, it is possible to prevent the magnetic attraction force from reducing due to decreasing the height dimension of the protruding portion 132.

In the present embodiment, multiple resin molding flow channels 132*h* are disposed at equal intervals around the cylindrical main body portion 131 in the direction of the cylinder center line (direction of the axis line C1). Therefore, when the molten resin is distributed to multiple resin molding flow channels 132*h*, it is possible to promote the uniform distribution of the molten resin.

Second Embodiment

The fuel injection valve 1 according to the first embodiment includes the movable core 30 having one core facing surface 31*c* (see FIG. 2). Due to this configuration, the magnetic flux (incoming magnetic flux) entering the movable core 30 and the magnetic flux (outgoing magnetic flux) exiting the movable core 30 are oriented in different directions (see the dotted arrow in FIG. 2). That is, one of the incoming magnetic flux and the outgoing magnetic flux is a magnetic flux that enters and exits in the axis line C1 direction to apply a valve opening force to the movable core 30, while the other of the incoming magnetic flux and the outgoing magnetic flux is a magnetic flux that enters and exits in the radial direction of the movable core 30 and does not contribute as the valve opening force.

Figure 6:
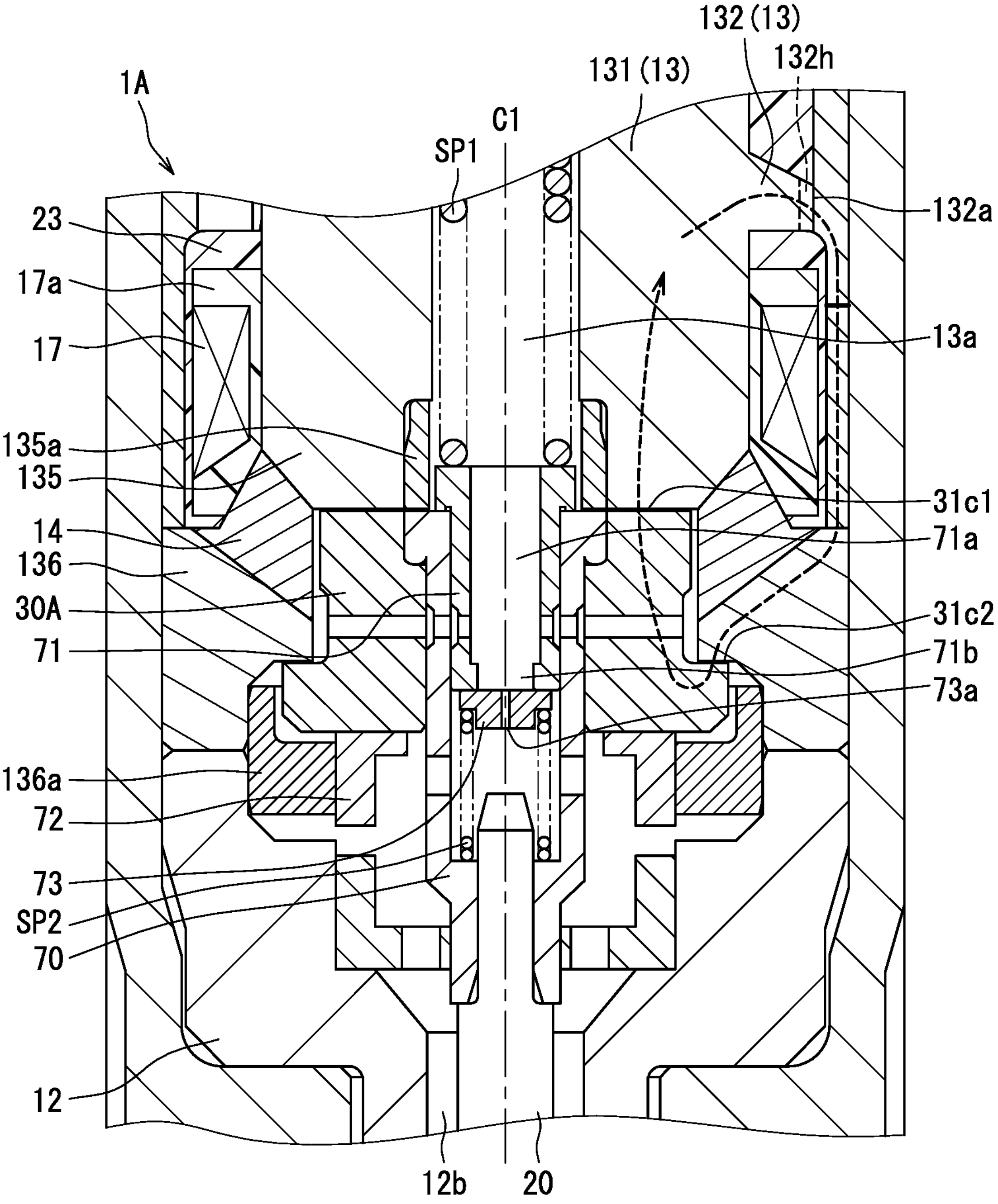
FIG. 6 is a cross-sectional view of a fuel injection valve according to a second embodiment.

On the other hand, a fuel injection valve 1A of the present embodiment illustrated in FIG. 6 includes a movable core 30A having two core facing surfaces, that is, a first core facing surface 31*c*1 and a second core facing surface 31*c*2. The fuel injection valve 1A further includes a first fixed core 135 having an attracting surface facing the first core facing surface 31*c*1, and a second fixed core 136 having an attracting surface facing the second core facing surface 31*c*2. A non-magnetic member 14 is disposed between the first fixed core 135 and the second fixed core 136. With this configuration, both of the incoming magnetic flux and the outgoing magnetic flux enter and exit in the axis line C1 direction to become a magnetic flux that causes the valve opening force to act on the movable core 30A (see a dotted arrow in FIG. 6). The movable core 30A and the needle 20 are connected by a coupling member 70, and an orifice member 71 is attached to the coupling member 70.

When the coil 17 is energized to cause the needle 20 to perform the valve opening operation, the movable core 30A is attracted to the fixed cores 135 and 136 by both the first core facing surface 31*c*1 and the second core facing surface 31*c*2. Therefore, the needle 20 performs the valve opening operation together with the movable core 30A, the coupling member 70, and the orifice member 71. At the full lift position of the needle 20, the coupling member 70 abuts against the stopper 135*a* fixed to the first fixed core 135, and the first core facing surface 31*c*1 and the second core facing surface 31*c*2 do not abut against the fixed cores 135 and 136.

When the energization of the coil 17 is stopped to cause the needle 20 to perform valve closing operation, the elastic force of the second spring member SP2 applied to the movable core 30 is applied to the orifice member 71. Therefore, the needle 20 performs the valve closing operation together with the movable core 30A, the coupling member 70, and the orifice member 71.

The slide member 72 is attached to the movable core 30A and operates for opening and closing together with the movable core 30A. The slide member 72 slides in the axis line C1 direction with respect to the cover 136*a* fixed to the second fixed core 136. In short, it can be said that the needle 20, which operates for opening and closing together with the movable core 30A, the slide member 72, the coupling member 70, and the orifice member 71, is supported by the slide member 72 in the radial direction.

The fuel flowing into the flow channel 13*a* formed inside the fixed core 13 flows through an internal passage 71*a* of the orifice member 71, an orifice 71*b* formed in the orifice member 71, and an orifice 73*a* formed in the moving member 73 in this order, and flows into the flow channel 12*b*. The moving member 73 is a member that moves in the axis line C1 direction so as to open and close the orifice 71*b*, and when the moving member 73 opens and closes the orifice 71*b*, a degree of throttling of the flow channel between the flow channel 13*a* and the flow channel 12*b* is changed.

Also in the fuel injection valve 1A according to the present embodiment, the length (height dimension) of the protruding portion 132 in the axis line C1 direction is set to be shorter toward the radially outer side of the fixed core 13. Therefore, the reduction of the injection pressure of the molten resin can be realized while restricting the reduction of the magnetic attraction force. Since the protruding end surface 132*a* of the protruding portion 132 is press-fitted into the yoke 15, the reduction of the press-fit load can also be realized while restricting the reduction of the magnetic attraction force.

In the present embodiment, the magnetic path cross-sectional area (tip area) at the contact portion between the protruding portion 132 and the yoke 15 is larger than the magnetic path cross-sectional area in the first core facing surface 31*c*1. The tip area is larger than the magnetic path cross-sectional area in the second core facing surface 31*c*2. Therefore, the magnetic flux can be restricted from being throttled by the tip area in the entire magnetic circuit.

Third Embodiment

Figure 7:
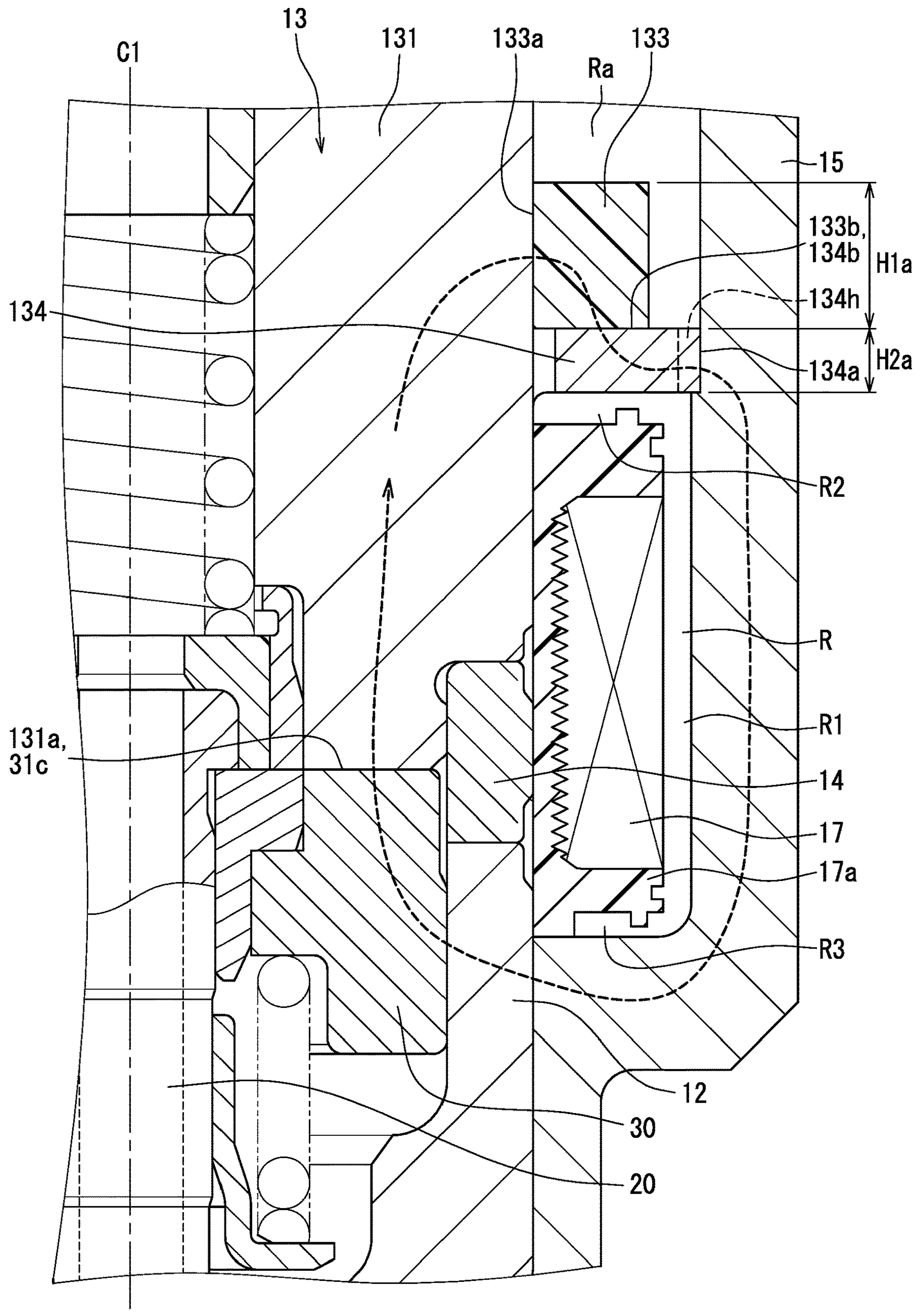
FIG. 7 is a cross-sectional view of a fuel injection valve according to a third embodiment.
Figure 8:
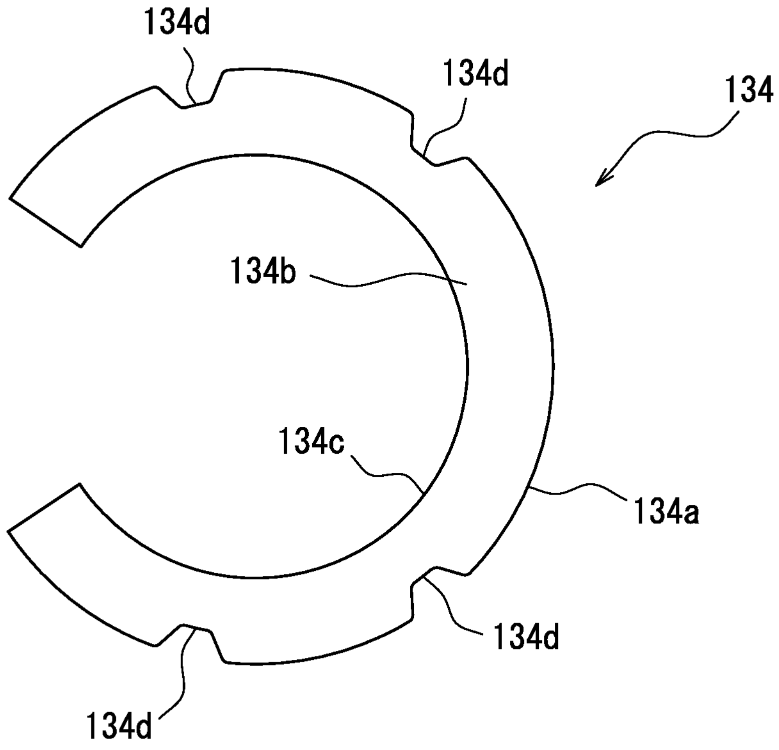
FIG. 8 is a top view of an outer protruding portion illustrated in FIG. 7 as seen from a side opposite to a nozzle hole.
Figure 9:
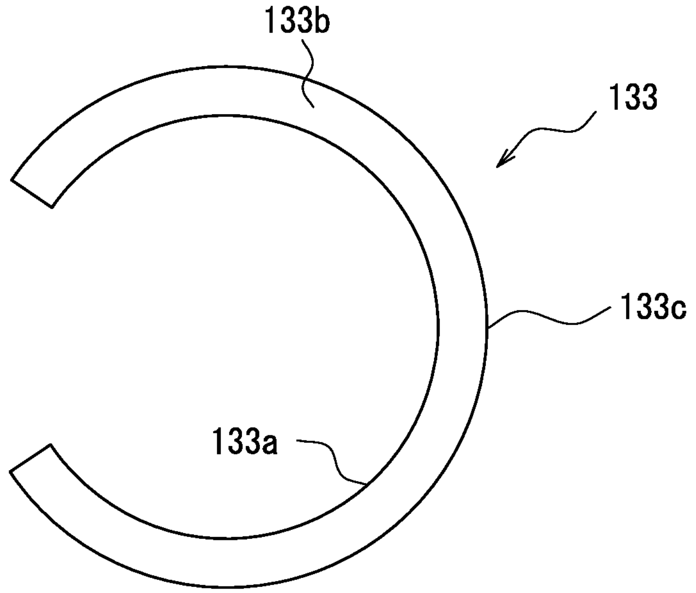
FIG. 9 is a bottom view of an inner protruding portion illustrated in FIG. 7 as seen from a nozzle hole side.

In the fuel injection valve 1 according to the first embodiment, the cylindrical main body portion 131 and the protruding portion 132 are integrally formed. Specifically, one base material is cut to form the cylindrical main body portion 131 and the protruding portion 132 which are integrated with each other. On the other hand, in the present embodiment, as illustrated in FIG. 7, the cylindrical main body portion 131 and the protruding portion are formed separately, and the protruding portion is assembled to the cylindrical main body portion 131. The protruding portion is formed by combining two members. One is an outer protruding portion 134 illustrated in FIG. 8 and the other is an inner protruding portion 133 illustrated in FIG. 9.

The inner protruding portion 133 and the outer protruding portion 134 are made of the same material, and these protruding portions are made of the same material as that of the cylindrical main body portion 131. The inner protruding portion 133 and the outer protruding portion 134 do not have a shape extending in an annular shape around the axis line C1, but have a shape extending in an arc shape at a portion excluding the terminal chamber Ra (see FIGS. 8 and 9). The length (height dimension) of the inner protruding portion 133 and the outer protruding portion 134 in the axis line C1 direction is constant regardless of the position in the radial direction.

The inner protruding portion 133 is press-fitted into the cylindrical main body portion 131. By this press-fit, the inner protruding portion 133 is supported and fixed to the cylindrical main body portion 131, and is positioned with respect to the cylindrical main body portion 131. An inner peripheral surface 133*a* of the inner protruding portion 133 is in close contact with an outer peripheral surface of the cylindrical main body portion 131. An outer peripheral surface 133*c* of the inner protruding portion 133 is separated from the inner peripheral surface of the yoke 15.

The outer protruding portion 134 is press-fitted into the yoke 15. By this press-fit, the outer protruding portion 134 is supported and fixed to the yoke 15, and is positioned with respect to the yoke 15. An outer peripheral surface 134*a* of the outer protruding portion 134 is in close contact with the inner peripheral surface of the yoke 15. An inner peripheral surface 134*c* of the outer protruding portion 134 is separated from the outer peripheral surface of the cylindrical main body portion 131.

The outer protruding portion 134 is formed with a resin molding flow channel 134*h* for causing the molten resin serving as the filling resin member 23 to flow into the coil chamber R. The resin molding flow channel 134*h* has a shape extending in parallel with the axis line C1 direction. The resin molding flow channel 134*h* is partitioned between a notch portion 134*d* provided on the outer peripheral surface 134*a* of the outer protruding portion 134 and the inner peripheral surface of the yoke 15.

In the axis line C1 direction, the inner protruding portion 133 is disposed on the side opposite to the nozzle hole of the outer protruding portion 134. A bottom surface 133*b* of the inner protruding portion 133 is in close contact with an upper surface 134*b* of the outer protruding portion 134.

The cylindrical main body portion 131, the inner protruding portion 133, the outer protruding portion 134, and the yoke 15 are in close contact with each other as described above, thereby forming a magnetic circuit through which a magnetic flux flows (see a dotted arrow in FIG. 7). The areas of the portions in close contact with each other correspond to the magnetic path cross-sectional area defined above. That is, the area (base end area) of the inner peripheral surface 133*a* of the inner protruding portion 133 and the area (tip area) of the outer peripheral surface 134*a* of the outer protruding portion 134 correspond to the magnetic path cross-sectional area. Of the bottom surface 133*b* of the inner protruding portion 133 and the upper surface 134*b* of the outer protruding portion 134, an area (intermediate area) of portions which are in close contact with each other also corresponds to the magnetic path cross-sectional area.

The circumferential length of the tip area does not include a portion that is not in contact with the yoke 15. Specifically, since a portion forming the terminal chamber Ra and the notch portion 134*d* are not in contact with the yoke 15, they are not included in the circumferential length of the tip area. A portion of the outer protruding portion 134, which is in contact with the yoke 15 by press-fit, is the target of the above-mentioned circumferential length.

A tip area is set larger than the base end area. These areas are specified by the height dimensions H1*a* and H2*a*, and the circumferential length. The circumferential length of the tip area is longer than the circumferential length of the base end area, and the height dimension H2*a* of the tip area is smaller than the height dimension H1*a* of the base end area. The tip area is set larger than the intermediate area.

In the axis line C1 direction, the length (height dimension) of the inner peripheral surface 133*a* of the inner protruding portion 133 is shorter (smaller) than the length (height dimension) of the outer peripheral surface 134*a* of the outer protruding portion 134. Therefore, the pressure loss when the molten resin flows through the resin molding flow channel 134*h* can be reduced by the shortening, and further, the heat loss of the molten resin that is transferred on the wall surface of the resin molding flow channel 134*h* can be reduced.

Furthermore, the diameter of the magnetic path cross-sectional area at the protruding portion formed by the inner protruding portion 133 and the outer protruding portion 134 increases toward the radially outer side of the fixed core 13. Therefore, even if the height dimension is reduced toward the radially outer side, the minimum value of the magnetic path cross-sectional area in the entire protruding portion can be kept unchanged. Therefore, the reduction of the injection pressure of the molten resin can be realized while restricting the reduction of the magnetic attraction force for driving the movable core 30.

Other Embodiments

Although multiple embodiments of the present disclosure have been described above, not only the combinations of the configurations explicitly illustrated in the description of each embodiment, but also the configurations of multiple embodiments can be partially combined even if they are not explicitly illustrated if there is no problem in the combination in particular. Unspecified combinations of the configurations described in multiple embodiments and the modifications are also disclosed in the following description.

In each of the above-described embodiments, the resin molding flow channel 132*h* is provided by the notch portion 132*d* formed in the protruding end surface 132*a*. On the other hand, the notch portion 132*d* may be eliminated, a through-hole extending in the axis line C1 direction may be formed in the protruding portion 132, and this through-hole may be used as the resin molding flow channel 132*h*.

In the first embodiment, the tip area of the protruding portion 132 is set larger than the base end area. On the other hand, the tip area may be the same as the base end area, or the tip area may be smaller than the base end area.

In the example illustrated in FIG. 2, the through-hole 31*a* is formed in the movable core 30, but the through-hole 31*a* may be eliminated. In the example illustrated in FIG. 5, the notch portion 132*d* has an arc shape when viewed in the axis line C1 direction, but may have a triangular shape or a quadrangular shape.

In the example illustrated in FIG. 4, the protruding upper surface 132*b* has a tapered shape, and the protruding bottom surface 132*c* has a horizontal shape. On the other hand, the protruding upper surface 132*b* may have a horizontal shape, and the protruding bottom surface 132*c* may have a tapered shape.

In the example illustrated in FIG. 4, the fixed core 13 is press-fitted and fixed to the yoke 15, but may be fixed by screw fastening instead of the press-fit. For example, each of the inner peripheral surface of the yoke 15 and the protruding end surface 132*a* may be threaded and screw fastened together.

In the first embodiment, the length of the protruding portion 132 gradually decreases from radially inner side to the outer side of the fixed core 13. On the other hand, a structure in which a size is reduced in a stepwise manner may be employed. For example, instead of forming the protruding upper surface 132*b* in a tapered shape, the protruding upper surface 132*b* may be formed in a step shape. In a case of such a step shape, as illustrated in FIG. 7, it may be realized by a protruding portion which is separate from the cylindrical main body portion 131, or may be realized by a protruding portion which is formed integrally with the cylindrical main body portion 131.

In the example illustrated in FIG. 7, the protruding portion formed separately from the cylindrical main body portion 131 is configured of two members. On the other hand, the protruding portion separate from the cylindrical main body portion 131 may be formed of one member. In the example illustrated in FIG. 7, the inner protruding portion 133 is disposed on the side opposite to the nozzle hole of the outer protruding portion 134, but the inner protruding portion 133 may be disposed on the nozzle hole side of the outer protruding portion 134 by reversing this disposition.

The resin molding flow channel 134*h* may be formed at a portion where the inner protruding portion 133 and the outer protruding portion 134 are in close contact with each other. Specifically, a notch may be formed in one of the bottom surface 133*b* of the inner protruding portion 133 and the upper surface 134*b* of the outer protruding portion 134, and a resin molding flow channel may be formed by the notch. Alternatively, in addition to the resin molding flow channel 134*h* being formed on the outer peripheral surface 134*a* of the outer protruding portion 134, a resin molding flow channel may be formed at a portion where the inner protruding portion 133 and the outer protruding portion 134 are in close contact with each other. Even in this case, it is desirable to set the tip area to be larger than the intermediate area.

In the first embodiment, the magnetic path cross-sectional area at the contact portion between the protruding portion 132 and the yoke 15 is larger than the magnetic path cross-sectional area in the core facing surface 131*a*, but the magnitude relationship may be reversed.

In the example illustrated in FIG. 5, the resin molding flow channels 132*h* are disposed at equal intervals in the circumferential direction, but may be disposed at unequal intervals. The number of the resin molding flow channels 132*h* is not limited to multiple, and may be one.

In the first embodiment, the movable portion M is supported in the radial direction at two positions of the portion (needle tip portion) of the needle 20 facing the inner wall surface 11*c* of the nozzle hole body 11, and the outer peripheral surface 51*d* of the cup 50. On the other hand, the movable portion M may be supported in the radial direction at two positions of the outer peripheral surface of the movable core 30 and the needle tip portion.

In the first embodiment, the inner core 32 is formed of the non-magnetic material, but may be formed of the magnetic material. In a case where the inner core 32 is formed of the magnetic material, the inner core 32 may be formed of a weak magnetic material that is weaker in magnetism than that of the outer core 31. Similarly, the needle 20 and the guide member 60 may be formed of a weak magnetic material that is weaker in magnetism than that of the outer core 31.

In the first embodiment, when the movable core 30 is moved by a predetermined amount, the cup 50 is interposed between the first spring member SP1 and the movable core 30 in order to realize the core boost structure in which the movable core 30 abuts against the needle 20 to initiate the valve opening operation. On the other hand, the cup 50 may be eliminated, a third spring member different from the first spring member SP1 may be provided, and a core boost structure may be employed in which the movable core 30 is urged to the nozzle hole side by the third spring member.

In each of the above embodiments, the needle 20 is configured to be movable with respect to the movable core 30, but the movable core 30 and the needle 20 may be integrally configured so as not to be movable relative to each other. When the second and subsequent injections of the divided injection are performed, it is necessary for the movable core 30 to return to the initial position. However, in a case where the movable core 30 and the needle 20 are integrally formed as described above, the needle 20 becomes heavy, and the valve closing bounce becomes easy. Therefore, the effect of restricting bounce by setting the seat angle θ to 90 degrees or less is suitably exhibited in the case of the above-mentioned integrated structure.

In the first embodiment, the fuel injection valve 1 is of the center disposition type which is attached to a portion of the cylinder head located at the center of the combustion chamber 2 to inject the fuel from above the combustion chamber 2 in the center line direction of the piston. On the other hand, the fuel injection valve may be a side disposition type fuel injection valve which is attached to a portion of the cylinder block located on the side of the combustion chamber 2 to inject the fuel from the side of the combustion chamber 2.

What is claimed is:

1. A fuel injection valve comprising:

a fixed core configured to form a part of a magnetic circuit that is to cause a magnetic flux to flow therethrough;

a movable core configured to form a part of the magnetic circuit and configured to be driven by a magnetic attraction force generated in a gap between the movable core and the fixed core;

a valve body configured to perform a valve opening operation caused by driving the movable core to open a nozzle hole to inject fuel;

a yoke configured to form a part of the magnetic circuit and accommodating the fixed core;

a coil placed in a coil chamber between the fixed core and the yoke and configured to generate the magnetic flux on energization; and a filling resin member with which the coil chamber is filled and having an electrical insulation property, wherein the fixed core includes:

a cylindrical main body portion that has a core facing surface facing the movable core; and a protruding portion that protrudes radially outward from an outer peripheral surface of the cylindrical main body portion and is in contact with the yoke to cause the magnetic flux to pass therethrough, the protruding portion defines a resin molding flow channel to cause molten resin serving as the filling resin member to flow into the coil chamber, a length of the protruding portion in a direction of a cylinder center line of the fixed core is set to be shorter toward a radially outer side of the fixed core, the protruding portion includes a base portion that is located on a side closer to the cylindrical main body portion and that does not define the resin molding flow channel, and an end portion that is located on a side closer to the yoke and that defines the resin molding flow channel, and the length of the base portion of the protruding portion in the direction of the cylinder center line gradually decreases from a radially inner side to the radially outer side of the fixed core.

2. The fuel injection valve according to claim 1, wherein the protruding portion is press-fitted to the yoke in a direction of the driving.

3. The fuel injection valve according to claim 1, wherein the resin molding flow channel is formed between a notch portion, which is in a protruding end surface of the protruding portion, and the yoke.

4. The fuel injection valve according to claim 1, wherein a magnetic path cross-sectional area of the magnetic circuit at a contact portion between the protruding portion and the yoke is larger than a magnetic path cross-sectional area of the magnetic circuit in the core facing surface.

5. The fuel injection valve according to claim 1, wherein the resin molding flow channel includes a plurality of the resin molding flow channels placed at equal intervals around the cylinder center line of the cylindrical main body portion.

6. The fuel injection valve according to claim 1, wherein the length of the protruding portion in the direction of the cylinder center line gradually decreases from the base portion to the end portion.

7. The fuel injection valve according to claim 1, wherein the protruding portion has a protruding upper surface on a side opposite to the coil chamber, and the protruding upper surface, in a cross-sectional view including the cylinder center line, has a tapered shape linearly extending from the base portion to the end portion in a direction inclining with respect to the cylinder center.

8. The fuel injection valve according to claim 3, wherein the end portion defines the protruding end surface of the protruding portion.

9. The fuel injection valve according to claim 1, wherein a width of the protruding portion in a direction perpendicular to the cylinder center line overlaps with a width of the coil in the direction perpendicular to the cylinder center line.

10. The fuel injection valve according to claim 1, wherein the protruding portion has a protruding upper surface on a side opposite to the coil chamber, and a resin member is provided on an outer peripheral surface of the fixed core and on the protruding upper surface of the protruding portion of the fixed core.

* * * * *